United States Patent [19]

Tokita

[11] Patent Number: 5,200,009
[45] Date of Patent: Apr. 6, 1993

[54] JOINING REINFORCED ELASTOMERIC SHEET MATERIAL

[75] Inventor: Noboru Tokita, Woodbridge, Conn.

[73] Assignee: The Uniroyal Goodrich Tire Company, Akron, Ohio

[21] Appl. No.: 565,592

[22] Filed: Aug. 10, 1990

Related U.S. Application Data

[62] Division of Ser. No. 376,480, Jul. 7, 1989, Pat. No. 5,021,115.

[51] Int. Cl.$^5$ .............................................. B29D 30/44
[52] U.S. Cl. ................................... 156/134; 152/548; 156/229; 156/266
[58] Field of Search ................ 156/157, 160, 163, 133, 156/134, 123, 137, 229, 304.1, 304.5, 304.6, 266, 406.6; 152/548, 560; 264/288.4, 288.8

[56] References Cited

U.S. PATENT DOCUMENTS

| | | | |
|---|---|---|---|
| 4,261,393 | 4/1981 | Saito et al. | 152/563 X |
| 4,466,473 | 8/1984 | Matyja et al. | 156/134 X |
| 5,098,768 | 3/1992 | Holroyd et al. | 156/304.1 |

FOREIGN PATENT DOCUMENTS

| | | | |
|---|---|---|---|
| 91649 | 7/1980 | Japan | 156/134 |
| 101805 | 6/1983 | Japan | 152/548 |

Primary Examiner—Geoffrey L. Knable
Attorney, Agent, or Firm—Greg Strugalski; Alan A. Csontos

[57] ABSTRACT

An apparatus for building a tire comprises a supply of elastomeric sheet material of a predetermined length and having spaced apart first and second end portions. A plurality of parallel extending reinforcing members are contained in the elastomeric sheet material of which adjacent reinforcing members are spaced apart a substantially equal first distance. An embosser for elastically deforming the first and second end portions of the elastomeric sheet material increases the distance between the adjacent reinforcing members in each of the first and second end portions to a second distance greater than the first distance. A drum is provided to receive the elastomeric sheet material with the first and second end portions overlapped. A mold is provided to bond together the first and second end portions of the elastomeric material in the overlapped portion under heated pressure to form a joint. At least one reinforcing member in the first end portion is located between a pair of radially extending planes containing a respective one of a pair of adjacent reinforcing members in the second end portion.

6 Claims, 7 Drawing Sheets

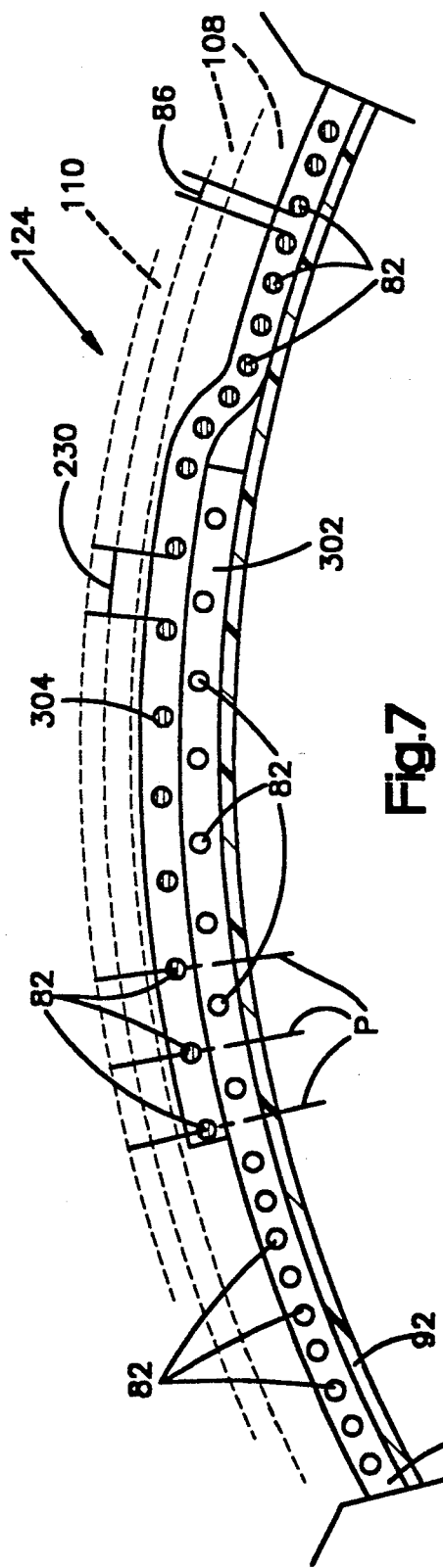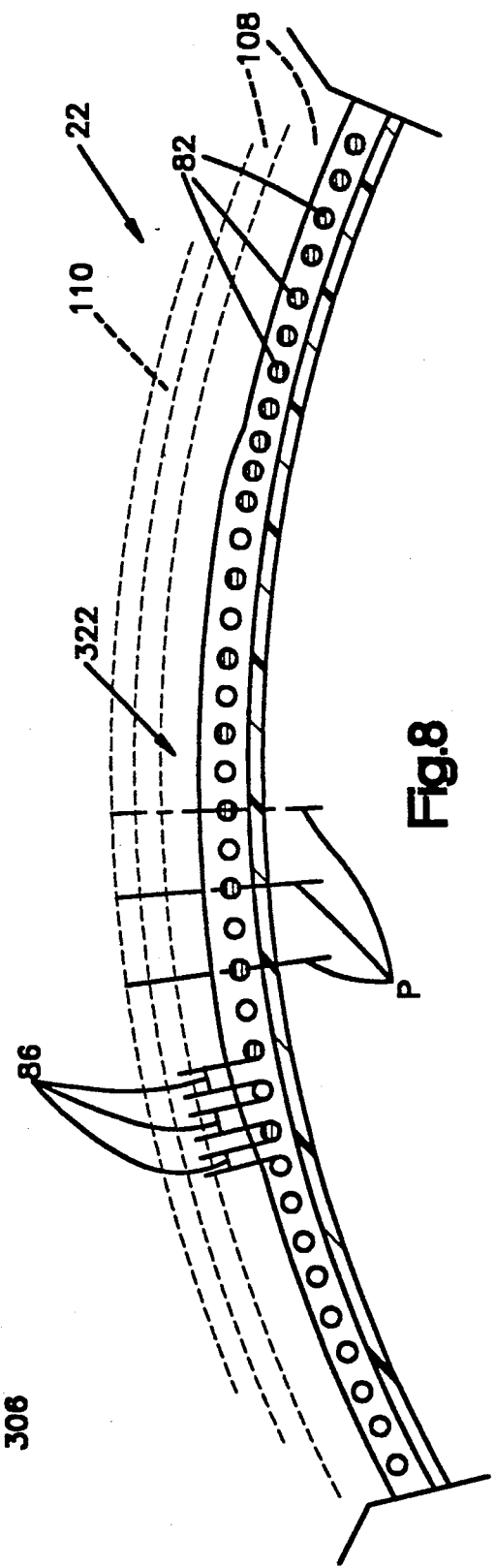

JOINING REINFORCED ELASTOMERIC SHEET MATERIAL

This is a divisional of copending application Ser. No. 07/376,480 filed on Jul. 7, 1989, now U.S. Pat. No. 5,021,115.

BACKGROUND OF THE INVENTION

1. Field of the Invention

The present invention relates to joining ends of elastomeric sheet material having parallel extending reinforcing members. Particularly, the present invention relates to joining ends of member reinforced elastomeric sheet material used in the construction of a tire.

2. Description of the Prior Art

A typical radial tire includes a carcass ply which is made from a strip of elastomeric sheet material having a plurality of parallel extending reinforcing members. The carcass ply is formed into a generally teroidal shape. Each reinforcing member in the carcass ply is contained in a plane extending substantially radially of the axis of rotation of the tire. The ends of the strip of elastomeric sheet material of the carcass ply are overlapped to form a joint and provide a relatively airtight article. The joint area of the carcass ply has an arcuate length taken in a direction perpendicular to the extent of reinforcing members in the range of approximately one-quarter inch to one inch.

The joint area of the carcass ply has a density of reinforcing members which is approximately double the density of reinforcing members in any other area of the carcass ply. This results in a joint area which has a tensile strength resisting tension in the reinforcing members due to tire inflation which is approximately twice the tensile strength of any other area of the carcass ply. The double strength of the joint area may result in a visable sidewall indentation in the tire. Furthermore, when the tire is tested for uniformity, a variation from the applied test load is often attributable to the double strength of the joint area.

U.S. Pat. No. 4,466,473 discloses one end of a strip of fiber reinforced elastomeric sheet material comprising the tire carcass ply being cut at several locations. The cut extends in a direction perpendicular to and across the reinforcing fibers for a distance approximately equal to the overlap distance. The cut end of the strip contributes no tensile strength to the joint for resisting tension in the reinforcing fibers due to inflation. Thus, the joint has a tensile strength which is substantially equal to the tensile strength of any other area of the tire carcass ply.

U.S. Pat. No. 4,261,393 discloses a carcass ply for a radial passenger tire including two or three strips of elastomeric sheet material cut and joined together at end portions. The end portions of the strips of elastomeric sheet material are specially made for the purpose of forming a joint.

In one embodiment of U.S. Pat. No. 4,261,393, the end portions of each strip of elastomeric sheet material used to form a joint contain reinforcing fibers of a smaller diameter than fibers in a portion of the strip intermediate the end portions. The smaller diameter reinforcing fibers have a proportionately lower tensile strength than the reinforcing fibers in the intermediate portion of the strip. When the end portions are overlapped and vulcanized, the smaller diameter reinforcing fibers form a joint which contains more fibers but has substantially the same tensile strength as the intermediate portion of the strip.

In another embodiment of U.S. Pat. No. 4,261,393, the end portions of each strip of elastomeric sheet material contain reinforcing fibers of a diameter equal to the reinforcing fibers in the intermediate portion of the strip. However, adjacent reinforcing fibers in the end portions of the strip are spaced apart a greater distance than adjacent reinforcing fibers in the intermediate portion of the strip. When the end portions are overlapped and vulcanized, reinforcing fibers from one of the end portions are forced between reinforcing fibers of the other end portion. The resulting spacing between adjacent reinforcing fibers is approximately the same as between adjacent reinforcing fibers in the intermediate portion. Thus, the tensile strength in the joint area is substantially equal to the tensile strength in the intermediate portion of the strip of elastomeric sheet material.

SUMMARY OF THE INVENTION

The present invention is directed to joining end portions of reinforced elastomeric sheet material used to make a carcass of a tire. The present invention includes means for supplying a predetermined length of elastomeric sheet material. The elastomeric sheet material has a plurality of parallel extending reinforcing members of a substantially equal diameter. The elastomeric sheet material has a first density of reinforcing members which is substantially uniform throughout the elastomeric sheet material. The density is defined as the number of reinforcing members per unit length of the elastomeric sheet material taken in a direction perpendicular to the direction that the reinforcing members extend. The present invention also includes means for changing the density of the reinforcing members in opposite end portions of the elastomeric sheet material to a second density which is less than the first density. The elastomeric sheet material is placed around a cylindrical surface of a drum so the end portions of the elastomeric sheet material overlap and the reinforcing members in the end portions extend substantially parallel to each other. The end portions of the elastomeric sheet material are bonded together under heat and pressure to form a joint having a density of a reinforcing members substantially equal to the first density. Thus, the tensile strength of the joint area is substantially equal to the tensile strength of any other area of the elastomeric sheet material and all the reinforcing members in the joint remain uncut.

The means for changing the density of the reinforcing members in the end portions of the elastomeric sheet material to the second density comprises means for gripping the elastomeric sheet material across one of the end portions at spaced apart locations. A cavity is located between a pair of parallel planes extending perpendicular to the elastomeric sheet material at the spaced apart locations. The cavity is also located on a side of the elastomeric sheet material when the elastomeric sheet material is gripped.

Tool means extends substantially parallel to the direction that the reinforcing members extend when the elastomeric sheet material is gripped. The tool means is located on another side of the elastomeric sheet material opposite the cavity and is movable in a direction transverse to the elastomeric sheet material. The tool means moves from a first position spaced from the elastomeric sheet material to a second position within the cavity to elastically deform a portion of the elastomeric sheet material and change the density of the reinforcing members. The tool means preferably moves a sufficient distance into the cavity to elastically deform the elastomeric sheet material so the second density is substantially equal to half of the first density. The end portions are bonded before the end portions of the elastomeric sheet material recover from the elastic deformation.

BRIEF DESCRIPTION OF THE DRAWINGS

Further features of the present invention will become apparent to those skilled in the art to which the present invention relates from reading the following specification with reference to the accompanying drawings, in which:

FIG. 7 is an enlarged cross-sectional view of a joint of the green tire in FIG. 2, taken approximately along line 7—7 in FIG. 2; and FIG. 8 is a view of the joint in FIG. 7 after curing the tire.

DESCRIPTION OF A PREFERRED EMBODIMENT

Figure 1:
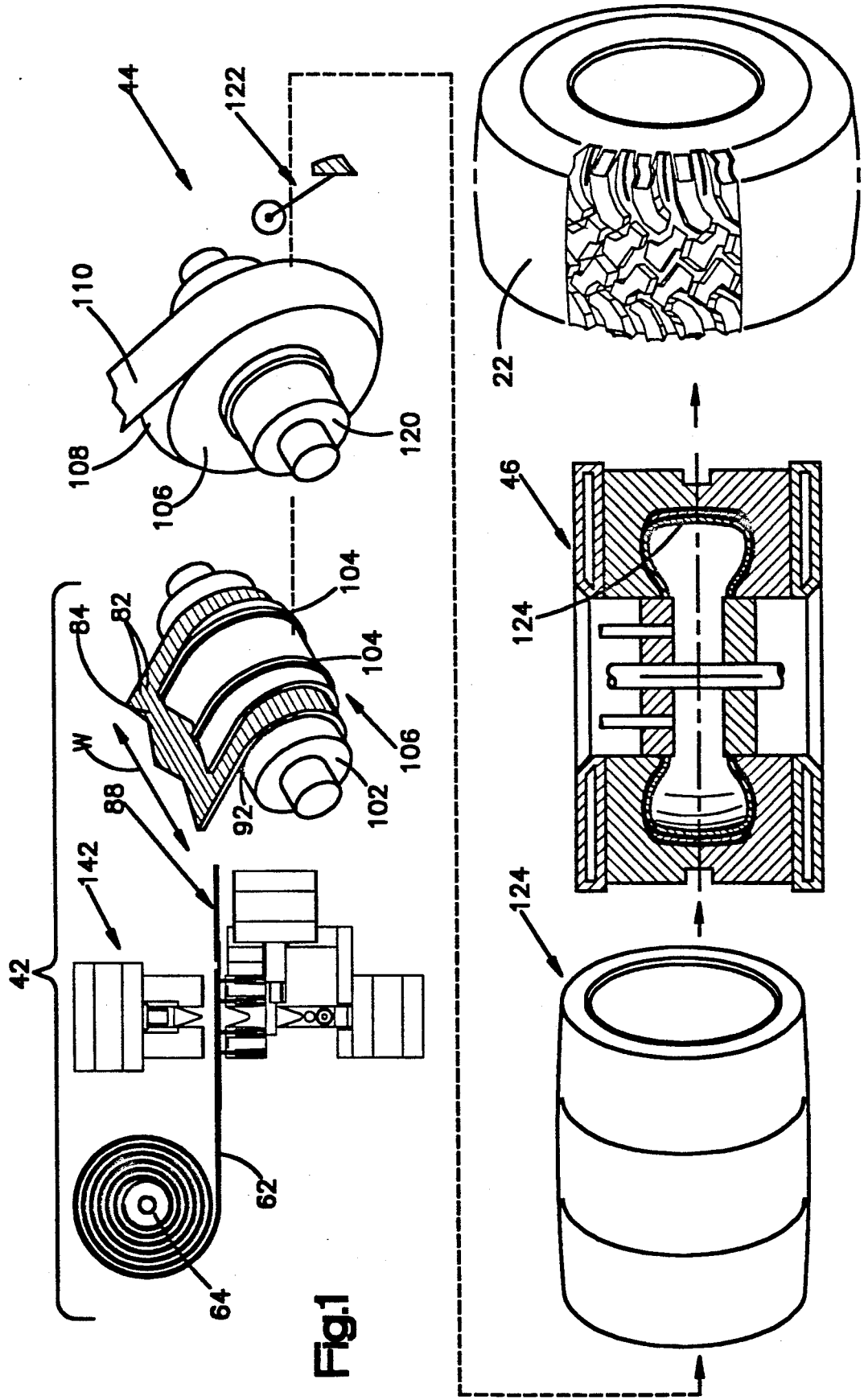
FIG. 1 is a schematic view of a tire build line embodying the present invention.

A tire build line 20 embodying the present invention is illustrated in FIG. 1. The tire build line 20 is preferably used for the construction of a radial passenger car or light truck tire 22, but it will be apparent that the tire build line can be adapted to other types of tire construction. The tire build line 20 includes a first stage machine 42, a second stage machine 44, and a mold 46.

The first stage machine 42 includes a roll 64 for supplying elastomeric sheet material 62 in sufficient quantity of material for building more than one tire 22. The elastomeric sheet material 62 has a width W typically in the range of 50 inches to 70 inches. The elastomeric sheet material 62 (FIG. 3) includes a plurality of parallel extending reinforcing members 82 encapsulated by calenderized rubber 84. The reinforcing members 82 are substantially equal in diameter. The diameter of the reinforcing members 82 is in the range of 0.010 inch to 0.070 inch and preferably is 0.025 inch for passenger car and light truck tires. The reinforcing members 82 extend in a direction generally perpendicular to the longitudinal central axis L of the elastomeric sheet material 62. The reinforcing members 82 are made from a suitable material such as polyester, nylon, rayon, aramid, glass or metal. The rubber 84 used in the elastomeric sheet material 62 is a suitable natural or synthetic rubber compound.

Figure 3:
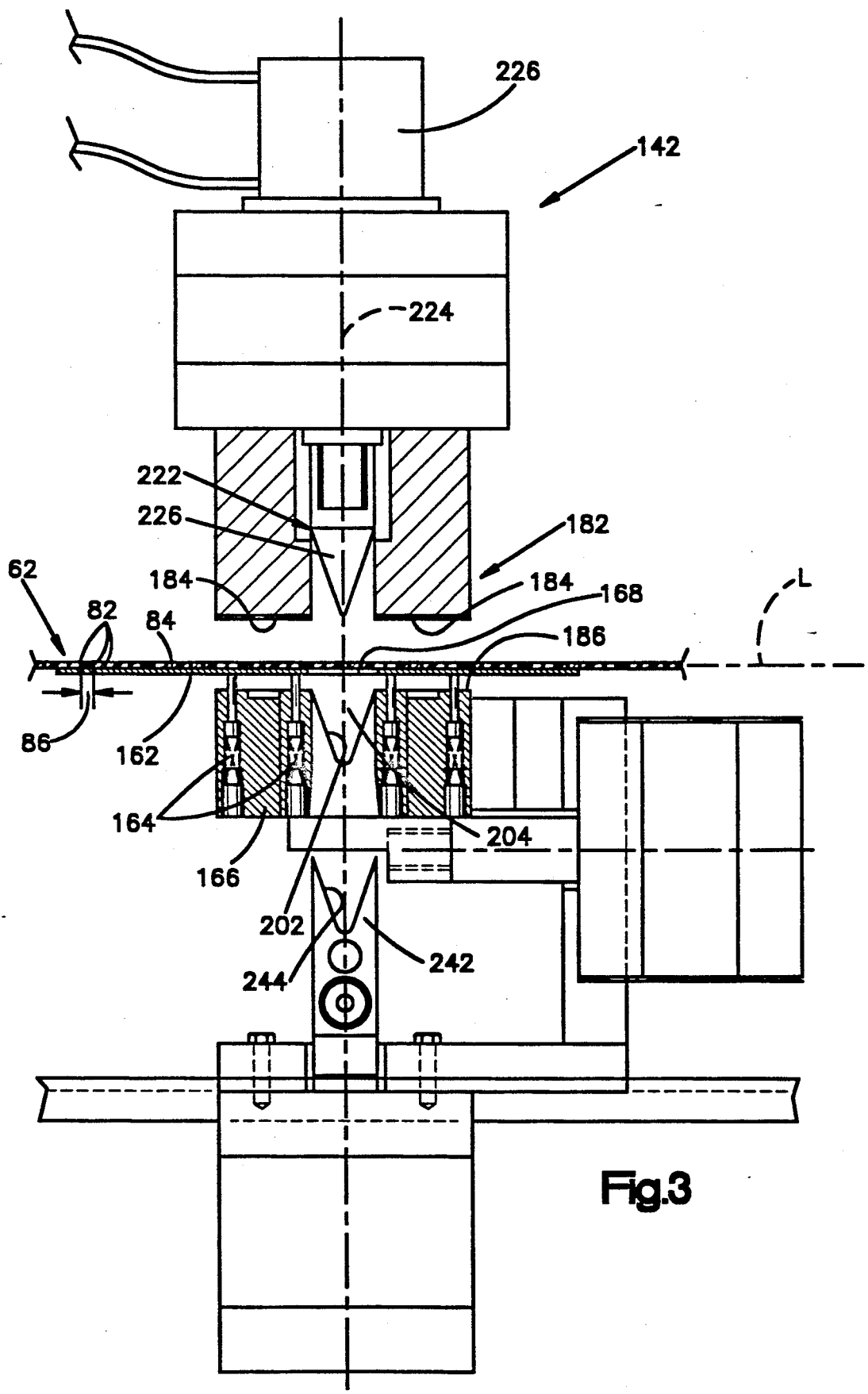
FIG. 3 is an enlarged partial cross sectional view of an embosser in FIG. 1.

Adjacent reinforcing members 82 are spaced substantially equidistant apart a first distance 86 (FIG. 3). Preferably the spacing 86 between adjacent reinforcing members 82 is equal to the diameter of the reinforcing members 82, which is 0.025 inch in the preferred embodiment. This results in the elastomeric sheet material 62 having a density of reinforcing members 82 which is stated in ends per inch (EPI). The density is defined as the number of reinforcing members 82 per unit length of the elastomeric sheet material 62 taken in a direction perpendicular to the direction the reinforcing members extend and along the axis L. The density of the members is in the range of 10 EPI to 40 EPI and is preferably 20 EPI.

Figure 2:
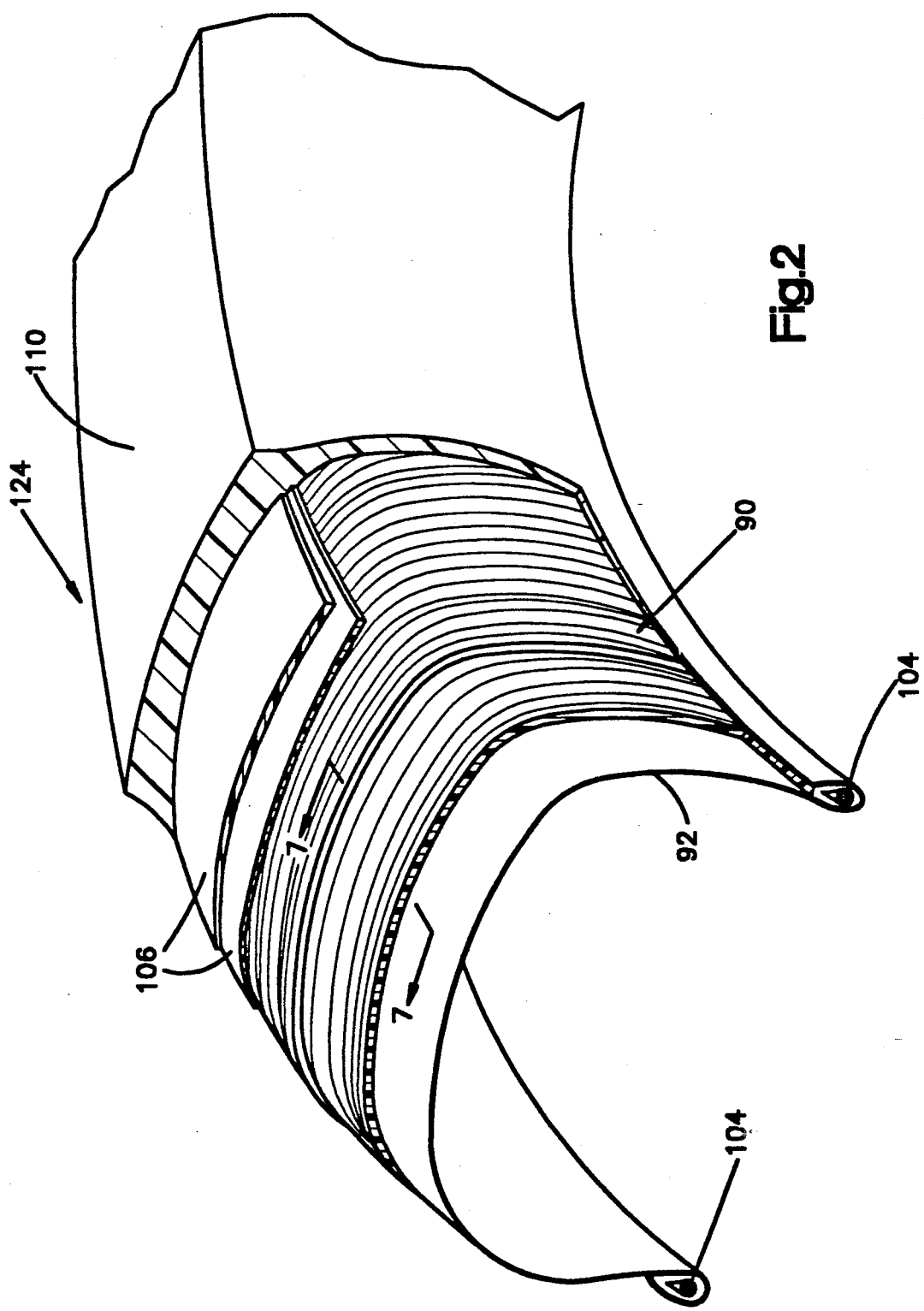
FIG. 2 is an enlarged perspective view of a green tire in FIG. 1, with portions removed for clarity.

The elastomeric sheet material 62 is removed from the roll 64 and is cut into a strip 88 of a predetermined length which is required for building a carcass 90 (FIG. 2) for a green tire 124. The strip 88 (FIG. 1) is wrapped around an elastomeric inner liner 92 on the outer circumference of a tire build drum 102 of the first stage machine 42. The ends of the strip 88 are overlapped an arcuate length between 0.1 inch to 1 inch, as illustrated in FIGS. 2 and 7. Beads 104 are placed on the strip 88 and the axial ends of the strip are turned up over the beads to form a generally cylindrical member 106.

The cylindrical member 106 is transferred to a drum 120 of the second stage machine 44. The cylindrical member 106 is circumferentially expanded and axially shortened at the second stage machine 44. Belts 108 and tread rubber 110 are applied to the cylindrical member 106. A stitcher 122 mechanically presses the belts 108 and tread rubber 110 to the cylindrical member 106 to form the green tire 124 (FIGS. 1 and 2). The green tire 124 is transported to the mold 46. In the mold 46, the green tire 124 is cured under heat and pressure to produce the finished tire 22.

According to the present invention, the first stage machine 42 includes an embosser 142 (FIGS. 1 and 3). The embosser 142 enables the formation of an overlap joint 322 (FIG. 8) in the strip 88 of elastomeric sheet material 62 without the disadvantages of a double strength joint area. The embosser 142 (FIG. 3) is located between the supply roll 64 of elastomeric sheet material 62 and the drum 102. The embosser 142 is movable along a track 144 in a direction parallel to the longitudinal axis L of the elastomeric sheet material 62. The mobility of the embosser enables the embosser to be located at a predetermined location along the elastomeric sheet material 62.

At the first stage machine 42, the elastomeric sheet material 62 extends through the embosser 142 as illustrated FIG. 3. The embosser 142 is slightly wider than the greatest width W of elastomeric sheet material 62. The elastomeric sheet material 62 rests on a support 162 of the embosser 142. The support 162 is biased by springs 164 located in bores in a base 166. The upper surface of the support 162, as viewed in FIG. 3, is smooth and has a relatively low coefficient friction. Thus, the elastomeric sheet material 62 may slide easily to the right, as viewed in FIG. 3, on the support 162 with little resistance. An opening 168 is centrally located in the support 162.

The embosser 142 includes a gripping device 182 having a pair gripper pads 184 which are spaced apart in a direction parallel to the longitudinal central axis L of the elastomeric sheet material 62. The gripping device 182 is movable downwardly, as viewed in FIG. 4, to engage the elastomeric sheet material 62 at spaced apart locations. The gripping device 182 restricts movement of the elastomeric sheet material 62 longitudinally through the embosser 142. Downward movement of the gripping device 182 also forces the support 162 against the bias of the springs 164 to engage an upper surface 186 of the base 166.

Figure 4:
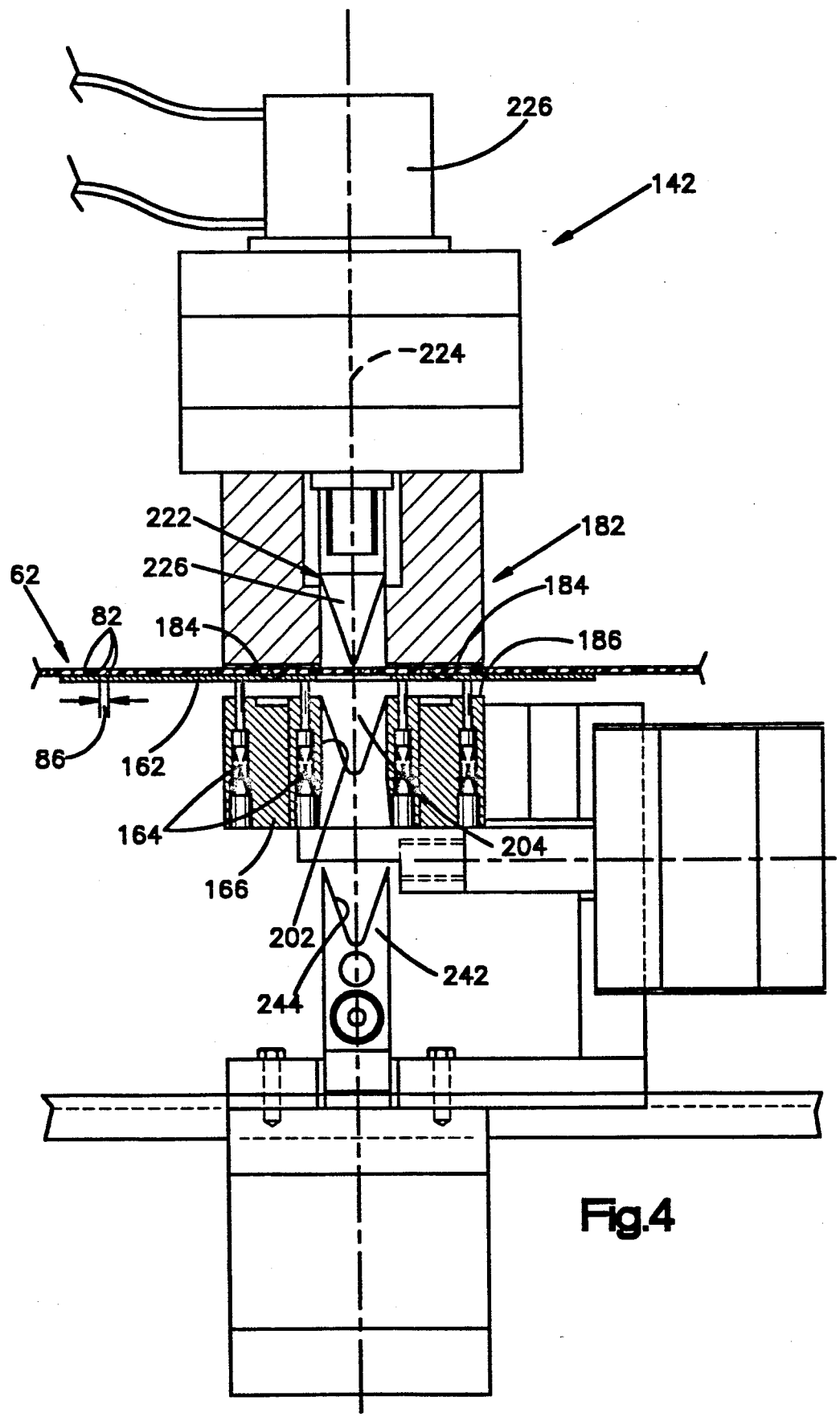
FIGS. 4-6 are enlarged views similar to FIG. 3 with parts in different positions.

The base 166 of the embosser 142 includes a surface 202 defining a cavity 204 located on the lower side of the elastomeric sheet material 62, as viewed in FIG. 4. The cavity 204 is also positioned between the locations at which the gripper pads 184 engage the elastomeric sheet material 62. The length of the cavity is greater than the width W of the elastomeric sheet material 62.

The embosser 142 includes a movable tool member 222 located on an upper side of the elastomeric material 62, as viewed in FIG. 4. The tool member 222 is centrally located in the gripper device 182,184. The tool member 222 is movable downwardly in a direction along its central axis 224 from the position illustrated in FIG. 4 to the position illustrated in FIG. 5. The tool member 222 is preferably actuated to move along the axis 224 by a fluid cylinder 226 (FIG. 3) which can be controlled either by an operator or by a computer associated with the first stage machine 42.

The tool member 222 has a generally V-shaped end portion 226 for contacting the elastomeric sheet material 62. The length of the tool member 222 is at least as great as the width W of the elastomeric sheet material 62. The tool member 222 is movable downwardly a sufficient distance along the axis 224 to extend through the opening 168 in the support 162 and into the cavity 204. During movement of the tool member 222 into the cavity 204, a portion 228 (FIG. 5) of the elastomeric sheet material 62 which is located between the gripper pads 184 is elastically deformed.

Figure 5:
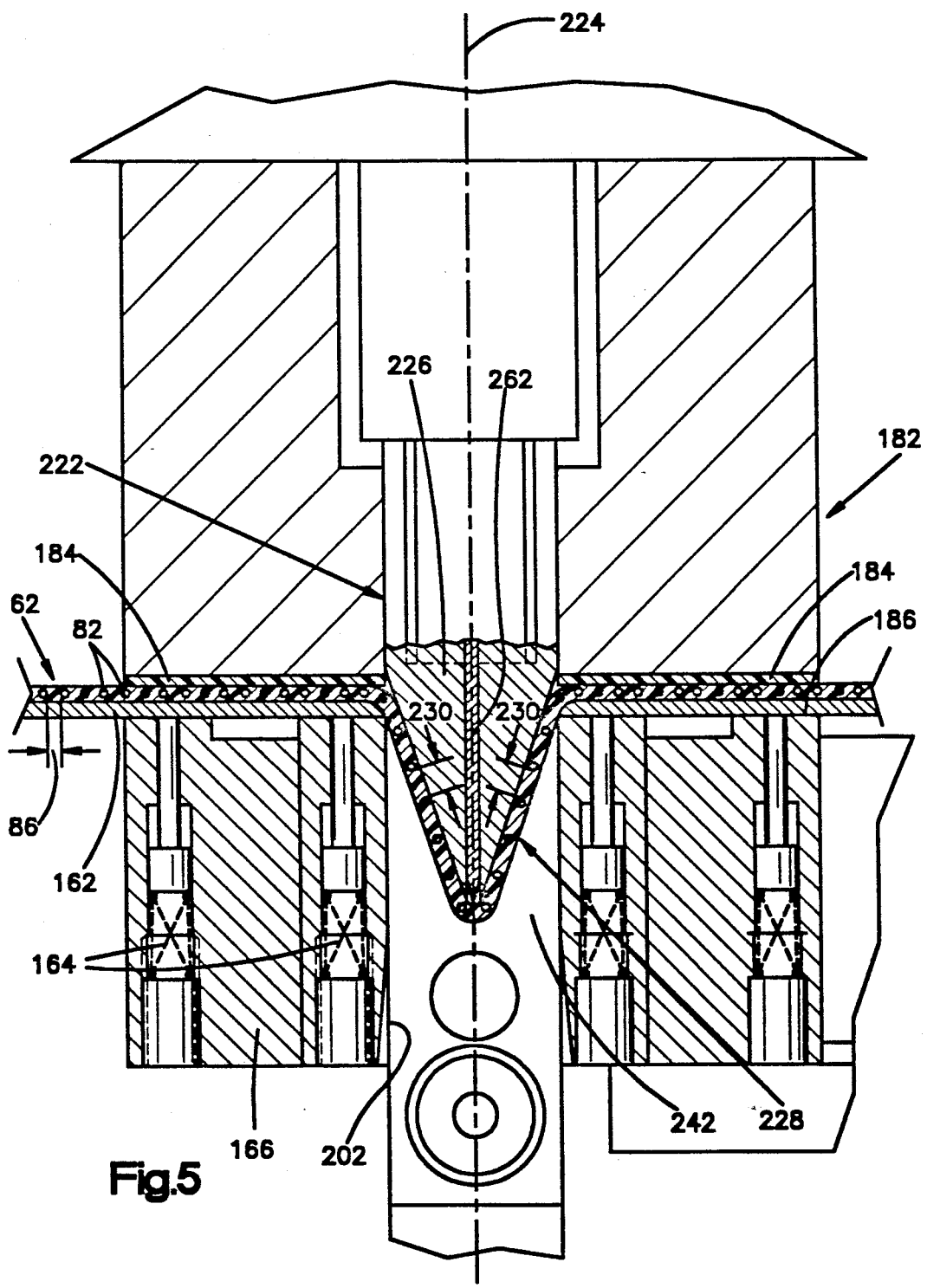

Thus, the embosser 142 mechanically deforms a portion of the elastomeric sheet material 62. The deformation preferably occurs within the elastic range of the elastomeric sheet material 62. During deformation of the elastomeric sheet material 62, the spacing 230 between the reinforcing members 82 in the deformed portion 228 increases, as illustrated in FIG. 5, from the spacing 86 between adjacent members in the remainder of the elastomeric sheet material 62. The spacing 230 between adjacent reinforcing members 82 in the deformed portion 228 is preferably at least three times the spacing 86 between the reinforcing members in the undeformed remainder of the elastomeric sheet material 62. It should be apparent that the density of the reinforcing members 82 proportionately decreases in the deformed portion 228. The decreased density of reinforcing members 82 in the deformed portion 228 is preferably at least one-half the density of reinforcing members in the undeformed remainder of elastomeric sheet material 62.

The elastomeric sheet material 62 is capable of "recovery". Recovery is defined as the deformed portion 228 of the elastomeric sheet material 62 elastically returning as close an possible to its original shape as a function of time so the reinforcing members 82 are spaced apart a distance substantially equal to the original spacing 86. Typically, the elastomeric sheet material 62 "recovers" seventy percent within the first five minutes after the elastic deformation. That is, the increased spacing 230 between the reinforcing members 82 in the deformed portion 228 loses 70 percent of the dimensional difference between the increased spacing 230 and the original spacing 86 in the first five minutes after deformation.

During movement of the gripper device 182, a heater element 242 is movable upwardly into the cavity 204 from the position illustrated in FIG. 4 to the position illustrated in FIG. 5. The heater element 242 engages the deformed portion 228 of the elastomeric sheet material 62 and partially heat sets the deformed portion 228 to retard the rate of recovery. This prevents a relatively fast rate of recovery of the deformed portion 228 of the elastomeric sheet material 62 to maintain the spacing 230 for a relatively longer period of time. The heater element 242 is heated in a range of 100° F. to 180° F. and preferably to 160° F. for a passenger or light truck tire carcass. The time the heater element 242 contacts the deformed portion 228 is between 2 to 7 seconds.

Figure 6:
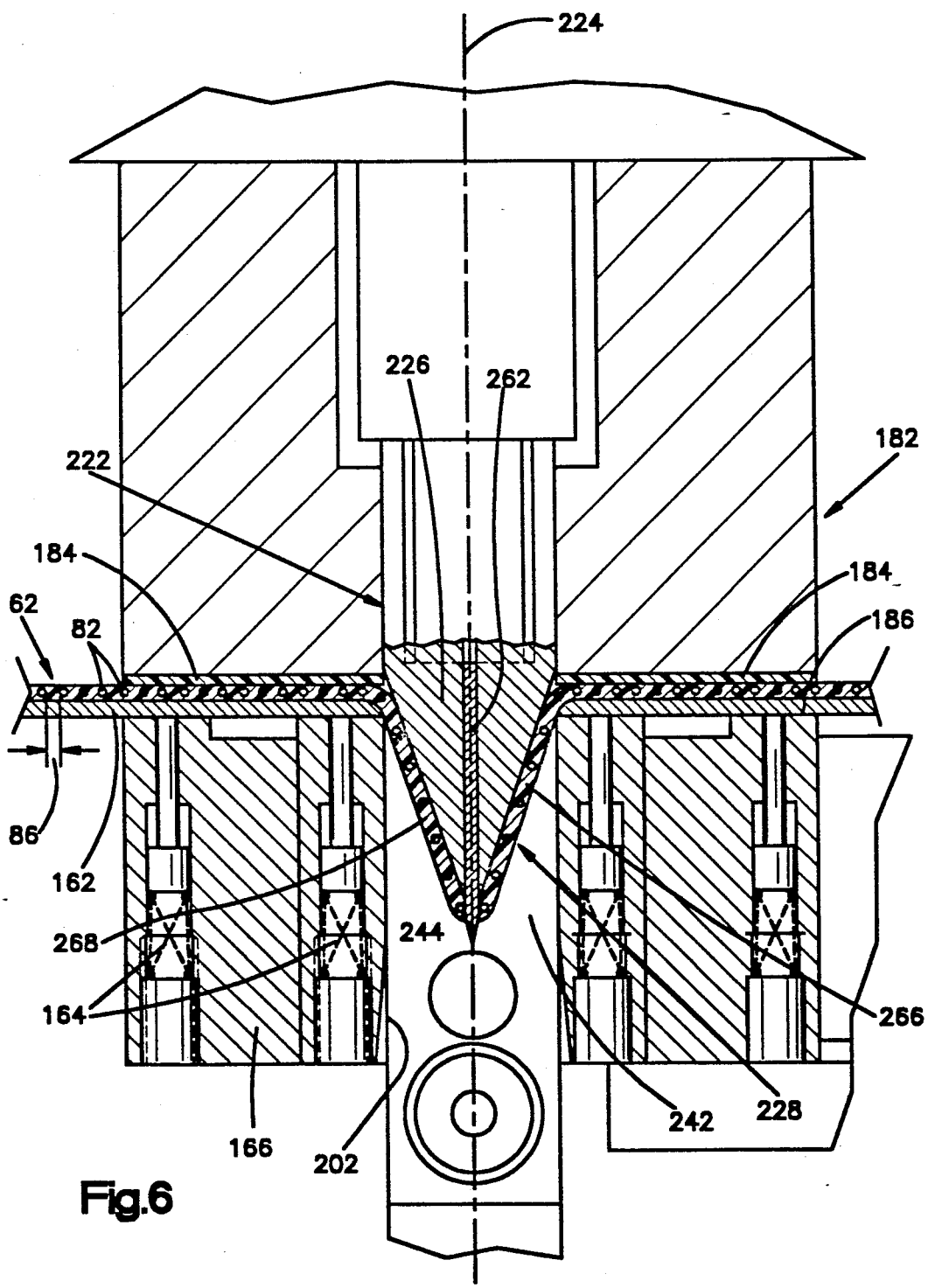

One way to cut a strip 88 of elastomeric sheet material 62 is to permit an operator of the first stage machine 42 to manually cut the elastomeric sheet material to the predetermined length. Another way to cut a strip 88 is to incorporate a cutting blade 262 (FIGS. 5 and 6) into the embosser 142 at a location upstream of the tire build drum 102. The cutting blade 262 may be included in the tool member 222 of the embosser 142.

The cutting blade 262 may be located anywhere in the embosser 142 but is preferably located centrally within the tool member 222. The length of the cutting blade 262 is substantially equal to the length of the tool member 222. The cutting blade 262 is movable downwardly, as viewed in FIG. 6, along the axis 224 into a cavity 264 (FIG. 6) of the heater element 242 after the tool member 222 presses the deformed portion 228 against a V-shaped surface 244 of the heater element. A fluid cylinder (not shown) is actuatable to move the cutting blade 262.

The cutting blade 262 provides a trailing end 266 (FIG. 6) on a strip of 88 the elastomeric sheet material 62 and a leading end 268 on a successive strip, both of which ends are elastically deformed. It is important that the carcass of the successive strip 88 be formed before the elastomeric sheet material 62 in the end portion 268 has a chance to recover a sufficient amount so that the density of reinforcing members 82 preferably remains between 0.5 and 0.67 times the density in the remainder of the elastomeric sheet material.

As illustrated in FIG. 7, the overlapped end portions 302, 304 of the strip 88 of elastomeric sheet material 62 forming the green tire 124 have a spacing 230 of reinforcing members 82 is at least three times as great as the spacing 86 of the members in the central portion 306 of the strip. For clarity, the reinforcing members 82 in the end portion 302 are illustrated as circles without cross-hatching and the reinforcing members in the end portion 304 are illustrated as circles with cross-hatching. The density of reinforcing members 82 in each of the end portions 302, 304 of the strip 84 in the joint is at least one half (0.5) times the density of the central portion 306. The overlapped end portions 302, 304 are somewhat tacky and, thus, retard recovery. The reinforcing members 82 in the first end portion 302 are aligned to extend substantially parallel to the reinforcing members 82 in the second end portion 304. Reinforcing members 82 in the first end portion 302 are preferably located between radially extending planes P which contain reinforcing members in the second end portion 304.

Once the green tire 124 is in the mold 46, the parts comprising the green tire are bonded together by vulcanization under heat and pressure. A reinforcing member 82 from the first end portion 302 is located in between a pair of adjacent members in the second end portion 304 to provide a density of reinforcing members in the joint substantially equal to that of the central portion 306 of the carcass 90, as illustrated in FIG. 9. Vulcanization preferably occurs before the elastomeric sheet material 62 recovers from the elastic deformation operation. Thus, the density of reinforcing members 82 in the joint 322 will be in the range of 1 to 1.33 times the density of reinforcing members in the remainder of the tire 22. After vulcanization, the tire 22 has a joint 322 (FIG. 8)

of substantially the same tensile strength as the rest of the carcass 90.

During testing the tire 22 for uniformity an appreciable change in uniformity at the joint 322 will not be apparent nor will a visible sidewall indentation appear. The tire 22, thus, is improved in uniformity characteristics when compared to those of heretofore known joints. The present invention also permits a relatively inexpensive forming of the reinforced tire cord fabric since special end portions of the elastomeric sheet material do not have to be provided.

From the above description of the preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. A method of building a tire carcass, said method comprising the steps of:
   providing a predetermined length of elastomeric sheet material having a plurality of parallel extending reinforcing members of a substantially equal diameter in which the elastomeric sheet material has a first density of reinforcing members defined as the number of reinforcing members per unit length of the elastomeric sheet material in a direction parallel to a line containing the centers of adjacent reinforcing members;
   elastically deforming opposite end portions of the elastomeric sheet material to change the density of the reinforcing members in each of the end portions to a second density less than the first density;
   overlapping the end portions to align the reinforcing members in the end portions in a direction substantially parallel to each other; and
   bonding together the end portions under heat and pressure to form a joint having density of reinforcing members substantially equal to the first density.

2. The method set forth in claim 1 wherein the deforming step comprises changing the density of the reinforcing members in the end portions to a second density at least half the first density.

3. The method set forth in claim 2 wherein the bonding step is completed before each of the deformed end portions elastically recovers and has a density of reinforcing members greater than 0.66 times the first density.

4. A method of building a tire carcass, said method comprising the steps of:
   providing a predetermined length of elastomeric sheet material having a plurality of parallel extending reinforcing members of a substantially equal diameter in which the reinforcing members are spaced apart a substantially equal first distance taken in a direction parallel to a line containing the centers of adjacent reinforcing members;
   elastically deforming longitudinally opposite end portions of the elastomeric sheet material to change the spacing of the reinforcing members in each of the end portions to a second spacing greater than the first spacing;
   overlapping the end portions to align the reinforcing members in the end portions in a direction substantially parallel to each other; and
   bonding together the end portions under heat and pressure to form a joint having the reinforcing members spaced apart a distance substantially equal to the first spacing.

5. The method set forth in claim 4 wherein the elastically deforming step comprises changing the spacing of the reinforcing members in the end portions to a second spacing at least three times the first spacing.

6. The method set forth in claim 4 wherein the bonding step is completed before each of the deformed end portions elastically recovers and has a spacing of reinforcing members less than 1.33 times the first spacing.

* * * * *